Sept. 12, 1939.  A. S. RIGGS  2,172,410
NONHUNTING ANGULAR CONTROL SYSTEM
Filed Oct. 12, 1936  3 Sheets-Sheet 2
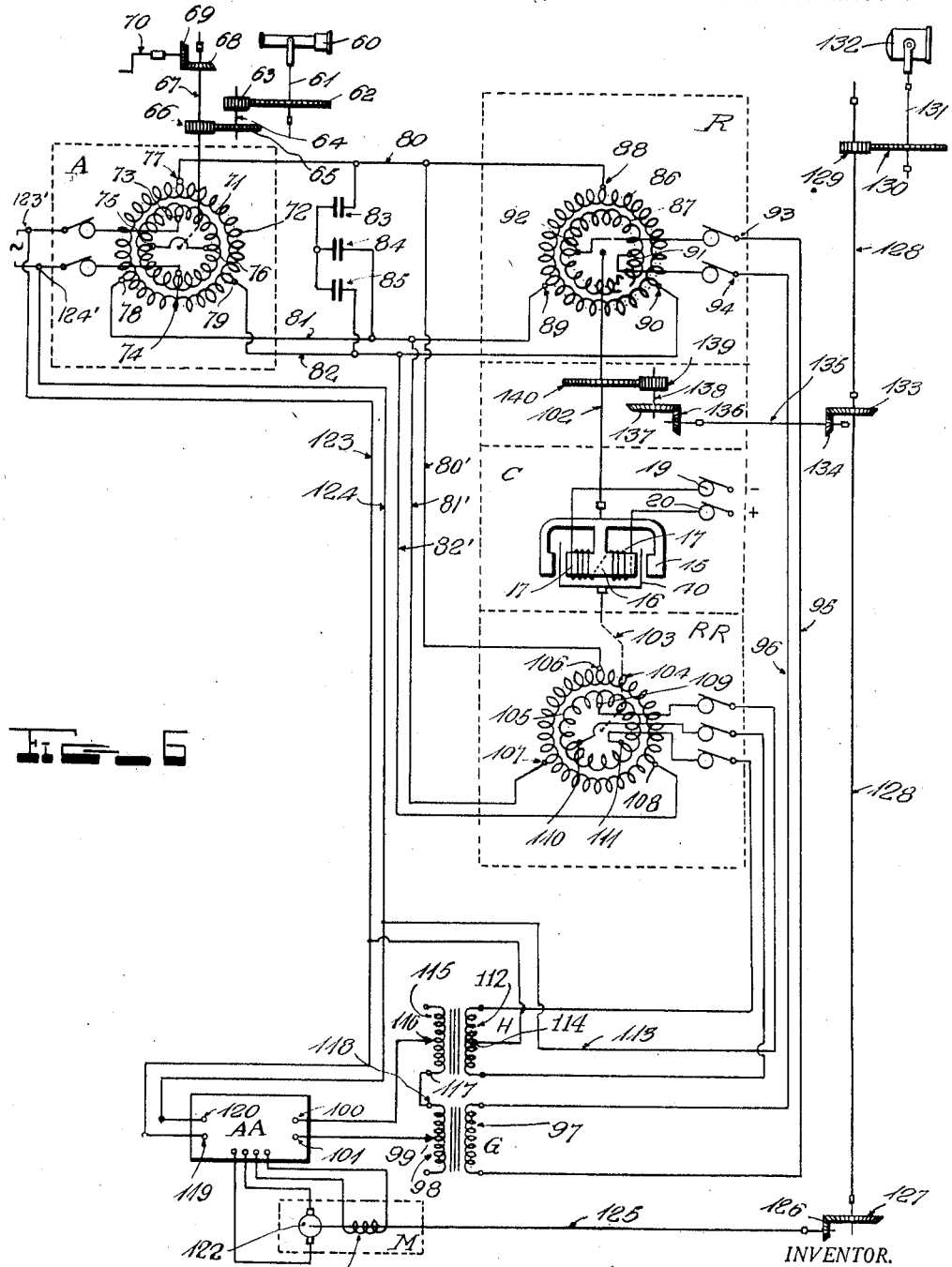
INVENTOR.
Alger S. Riggs,
BY
John B. Brady
ATTORNEY.

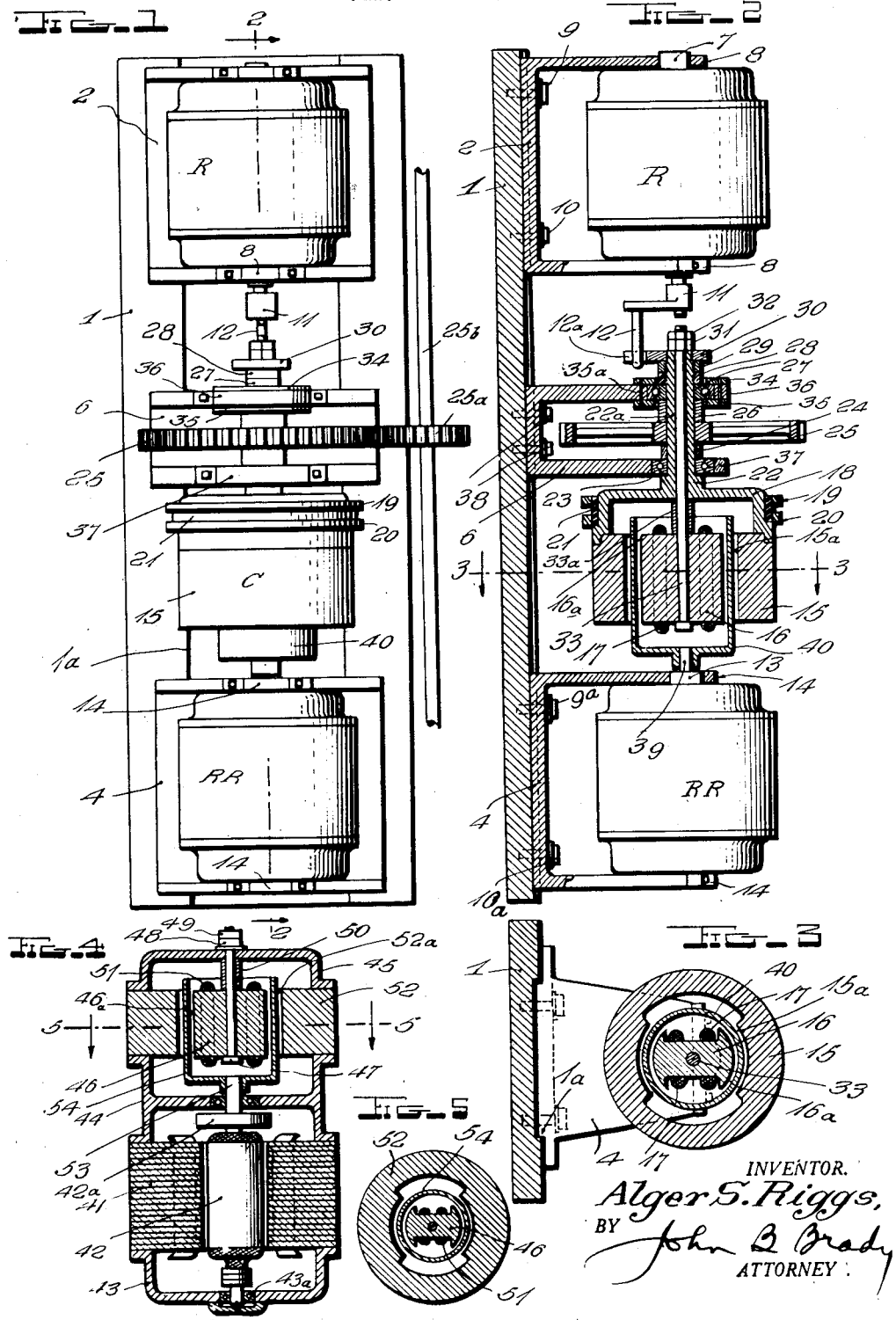

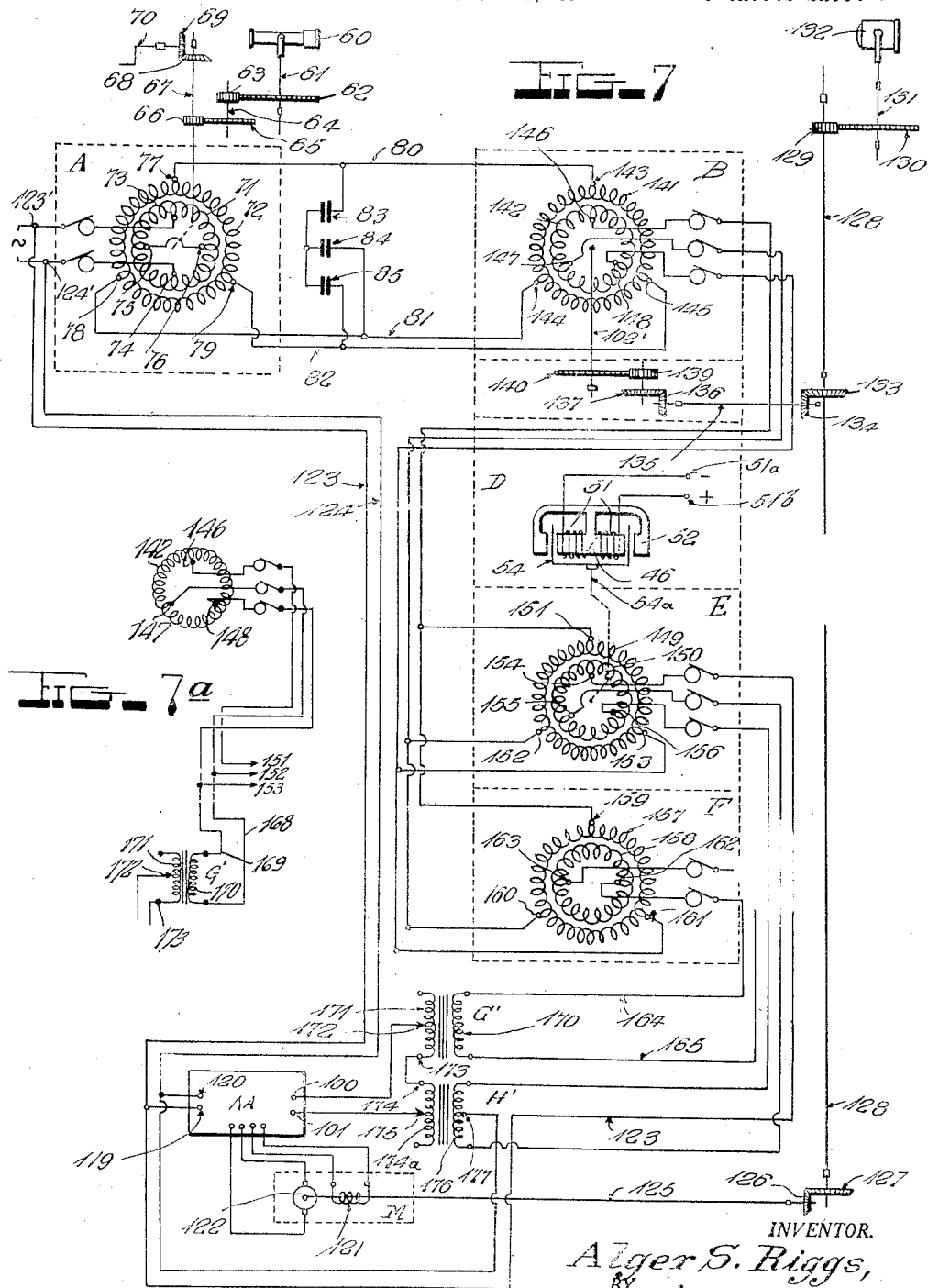

Patented Sept. 12, 1939

2,172,410

UNITED STATES PATENT OFFICE 2,172,410

NONHUNTING ANGULAR CONTROL SYSTEM

Alger S. Riggs, Washington, D. C., assignor of one-third to John B. Brady, Washington, D. C.

Application October 12, 1936, Serial No. 105,349

8 Claims. (Cl. 172—239)

My invention relates broadly to angular position control systems such as are employed for the remote positioning of searchlights, guns, steering gear mechanism, and the like, from a directing or transmitting station remote from the object to be controlled, and more particularly to an improved system of remote control having a high degree of accuracy.

One of the objects of my invention is to provide an apparatus, method of control, and circuit arrangement therefor, whereby high degrees of accuracy may be obtained in a remote angular positional control system substantially free of detrimental effects of hunting.

Another object of my invention is the provision of apparatus and methods of utilizing such apparatus whereby high degrees of accuracy and freedom from dynamic hunting, commonly referred to as surging, may be secured in a remote angular positional control system with simple and easily adjusted apparatus.

Still another object of my invention is the provision of means in a remote electrical angular positional control system for obtaining a control signal for the follow-up motor which assists in bringing the controlled load up to correct speed when the displacement between transmitted direction and controlled object is increasing, while also providing means for a control signal component which assists in bringing the load to a quick stop when the displacement between transmitted direction and controlled object is decreasing.

A further object of my invention is the provision of circuits and apparatus by which the various component parts of the control signal actuating a remote angular positional control system may be independently adjusted to meet varying conditions of inertia and resistance loading on the controlled object.

These and other objects of my invention will be manifest from the following specification and the appended claims together with the accompanying drawings in which:

Figure 1 is an elevational view of two component parts of a remote angular positional control system arranged on a common base in accordance with my invention and coupled together in accordance with and through apparatus forming a part of my present invention; Fig. 2 is a vertical sectional view partially in side elevation of the apparatus shown in Fig. 1, in which the essential features of one form of coupling device embodying my invention are illustrated; Fig. 3 is a horizontal sectional view taken on line 3—3 of Fig. 2 showing a transverse section through the coupling apparatus forming a part of my invention; Fig. 4 is a longitudinal sectional view of a "Selsyn" type repeater motor utilized in one circuit embodying my present invention and shown as built into a unit with an electro-magnetic damping device similar generally to the coupling device shown in detail in Figs. 1—2—3; Fig. 5 is transverse sectional view taken on line 5—5 of Fig. 4 which illustrates the construction of the damping device; Fig. 6 illustrates a complete angular positional control system constructed according to my present invention and utilizing as a component part the apparatus shown in detail in Figs. 1—2 and 3; Fig. 7 is a complete angular positional control system constructed according to my invention and utilizing as a component part the apparatus shown in detail in Figs. 4 and 5; and Fig. 7a shows a modification of a portion of Fig. 7.

In electrical remote positioning control systems, in which a heavy object is angularly controlled from a "Selsyn" type data transmitter, it is essential that the load or controlled object be made to faithfully follow the movements of the transmitter without "overshooting" the coincidence point. Also it is essential that the object be made to follow with great accuracy the angular direction of the transmitter during periods of high acceleration.

Heretofore numerous circuits have been utilized in an effort to effectively control the inertia of the controlled object in a manner calculated to prevent the detrimental effects of "hunting" and "overshooting", and while such circuits have been effective to some degree, the apparatus and methods employed have generally been of complex and delicate nature, requiring frequent adjustment for changes in load conditions of the controlled object.

My present invention provides means for producing a "dead beat" or non-hunting follow-up control system possessing high degrees of accuracy and stability while at the same time employing simple and effective methods of obtaining permanent adjustment.

Referring to Figs. 1, 2 and 3 in detail, the "Selsyn" type receiving devices R and RR are mounted on a common base 1 by the supporting brackets 2 and 4 and secured by suitable means such as bolts shown at 9—10—9a—10a. The top receiver R is adapted to be driven by the follow-up system through the gear 25 and through the coupling 11—12—12a and 30, while the lower receiver is dynamically coupled to the other receiver through the electromagnetic "drag" device C.

The device C consists of the outer core 15 secured by suitable means to the end bell 18, an extension 22a of which serves to support the entire mechanism in the bracket 6 and to carry the driving gear 25. A shoulder 22 serves to position the inner race of the free ball bearing 23, while the spacer 24, gear 25, spacer 26, inner race of bearing 27 are all locked on the extension 22a of the end bell 18 by the thread lock rings 28—29 forming a complete unit. The rings 34—35 attached to the bracket 6 and the cap 36 by the through bolts 35a serve to retain the outer race of the ball bearing 27 thereby supporting the entire assembly of the device C. The coupling 30 is keyed to the shaft and has a slot 12a which is engaged by pin 12, carried by arm 11 for driving the rotor of the receiver R.

The device C has an inner core 16 maintained in position by the bolt 33, spacer 33a and nuts 31—32. Upon the inner core 16 are wound the field coils 17 which are electrically connected (by leads not shown) to the slip rings 19—20 supported on the end bell 18 and insulated therefrom by the insulating material 21.

Brushes (not shown on the drawings) serve to convey current to the rings 19—20 and hence to the field windings 17.

The receiver R is supported in the bracket 2 as shown by the hub 7 being clamped by the cap 8. The receiver may be rotated about its axis for purposes of adjustment and is locked in a selected position by tightening the bolts of the clamps 8.

Likewise the receiver RR is held by the hub 13 being secured in position by means of clamp 14. The bolts extending through the clamp 14 and into the bracket insure the rigid support of the receiver RR.

The rotor, of conducting but non-magnetic material, 40 of the device C is attached at 39 to the shaft of the receiver RR and is free to rotate in the annular air gaps 15a and 16a separating the main core 15 and the inner core 16. With the field coils 17 energized from a suitable source of D. C. power the coupling device C, due to the flux across gap 16a—17a through the rotor 40, will tend upon rotation, to revolve the rotor of the receiver RR due to the heavy eddy currents set up by rotation of the rotor 40 in the flux between the core 15 and the inner core 16. Likewise if the coupling C is not rotating it will be understood that under like conditions the rotor of the receiver RR is restrained or "damped" in rotation by the eddy currents induced in the rotor 40.

In other words, the coupling device C provides coupling between the driven receiver R (top) and the free receiver RR (bottom) which depends upon their relative rates of rotation.

If either is rotated relative to the other at a high rate the coupling is large tending to oppose the movement, while either may freely move relative the other at a very slow rate.

Thus the receiver RR may assume a position corresponding to the angular direction of the transmitter to which it is connected independently of the angular position of the receiver R, but its movement is so "damped" that it may move only at a very slow rate of speed from one angular position to another.

In Figs. 4—5, I have shown a "Selsyn" type receiver built in a unit with an electromagnetic damping device generally similar to the coupling device C. The "Selsyn" receiver comprises the stator and associated coils 41, the rotor 42 and the end bell 43. The upper end of the stator is attached to the bonnet 44 which holds the outer core 52 of the damping device. End bell 45 is attached to the other end of the core 52, thereby forming a single direct connected unit of the "Selsyn" receiver and the damping device. The inner core 46 of the damping device with field coils 51 is supported and held with respect to the end bell 45 by the bolt 47, spacer 50 and nuts 48—49. Terminals not shown provide for circuit connections for energizing the field coils 51 from a suitable source of direct current power.

A rotor 54 (similar to rotor 40 of Fig. 2) is attached to the shaft of the receiver at point 53 so that rotation of the receiver rotor is "damped" in fashion similar to the damping of the rotor of the receiver RR of Figs. 1-2-3.

The thrust of the rotor of the receiver in Fig. 4 is taken by a ball thrust bearing as shown at 43a, and similarly, though not shown, the rotor of the receiver RR in Figs. 1-2-3 is also supported on a like ball thrust bearing.

In Figs. 1-2-3-4-5 certain essential details as brushes and terminal leads are omitted for sake of clarity inasmuch as their arrangements are well known to the art and except diagrammatically are of no importance to an understanding of my invention.

A mechanical damper 42a is shown in Fig. 4, but it is sometimes better to omit this inasmuch as it adds considerable inertia to the receiver rotor, and its advantage is largely eliminated through the electromagnetic damping of the rotor 54 in the flux of the damper section of the machine shown in Figs. 4-5 when rotating in the annular air gap 52a and 46a.

Referring now to Fig. 6, I have shown in diagrammatic form a complete angular positional control system embodying my invention and utilizing the apparatus shown in detail in Figs. 1, 2 and 3.

In this figure a searchlight 132 is made to follow the angular position of the telescope 60. The telescope is moved angularly by the hand crank 70 through the gears 69—68, shaft 67, gears 66—65, shaft 64, gears 63—62 and shaft 61. Simultaneously the shaft 67 drives the rotor of the transmitting device A. In accordance with the control system hereinafter described in detail, the motor M through shaft 125, gears 126—127, shaft 128, gears 129—130, and shaft 131 control the angular position of the searchlight 132 in agreement with the telescope 60.

The transmitter A comprising the primary winding 71 (here shown on the rotor) supplied at points 73—74 from a suitable source of alternating current power and short circuited between the points 75—76 to reduce flux distortion is adapted through its cooperating secondary winding 72 (here shown on the stator) to transmit angular direction to the control system.

The transmitter secondary winding 72 is tapped at points 77—78—79, thus simulating a three phase winding, and connected through conductors 80—81—82 to corresponding points 88—89—90 respectively, of the primary winding 86 of the receiver R which is adapted to provide the displacement control signal component. The secondary winding 87 (rotor) of the receiver R is tapped at points 91—92 and connected through the slip rings to terminals 94—93 thence through conductors 96—95 to the terminals of the primary winding 97 of the displacement signal transformer G. Simultaneously with the movement of the searchlight, the rotor of the receiver R is synchronously driven through gears 133—134, shaft 135, gears 136—137, shaft 138, gears 139—140 and shaft 102. In this diagram the shaft 102, gears 140—139 and shaft 138 correspond respectively to 22a, 25, 25a and 25b of Figs. 1 and 2.

The transmitter secondary winding is also connected to the stator winding 104 of the receiving device RR through conductors 80'—81'—82' to points 106—107—108. The rotor winding 105 of this receiving device is tapped at points 109—110—111 and so connected to the transformer H and the source of power energizing the transmitter A that the rotor and stator of the receiving device RR operate as a standard "Selsyn" type repeater in following the angular position of stator and rotor of the transmitter A, and in addition, provide a voltage across the primary winding 112 of the "rate" signal transformer H due to relative displacement of the rotor winding 105 and the flux in the stator produced by the currents in the stator windings 104. This double function of the receiving device RR may be best understood by considering it only in relation to the transmitter A.

It will be seen that the transmitter A and the receiving device RR are fundamentally equivalent to a conventional "Selsyn" type transmitter and receiver, the rotor 105 of the receiving device RR being "polarized" on the vertical axis corresponding to point 109 and a point midway between points 110—111 through power supplied at point 109 and the center tap 114 of the primary winding 112 of the transformer H. Now when the rotors of transmitter A and device RR are in exact angular agreement there is no voltage present across the primary winding 112 of the transformer H since this winding is connected at its outer terminals to the rotor winding 105 at points 110—111, which are 90° inductively from the normal flux axis in the device RR. However upon relative movement of rotor winding and stator flux, a voltage exists across points 110—111 and hence across the primary winding 112 of the transformer H.

Normally the rotor of the device RR is free to establish the equilibrium position with the transmitter A, under the retarding or damping action of the magnetic coupling device C. Therefore, under any "steady state" condition the rotor of the device RR is in agreement with the rotor of the transmitter A, and no voltage is present at the primary winding 112 of the transformer H.

The coupling device C (described in detail in reference to Figs. 1, 2 and 3) tends to opposed relative motion of the rotors of the receiver R and the device RR in proportion to the rate of the movement, hence a rapid movement of the rotor of device R results in a strong torque tending to produce a like movement in device RR. Likewise a quick movement of the rotor of device RR resulting from its own internal torque is opposed by the coupling device C.

The static condensers 83—84—85 serve to supply a portion of the wattless magnetizing currents taken by the receiving control system, thus preventing overloading of the transmitter A as shown in my copending application Serial No. 101,529, filed September 18, 1936.

Suppose now that the entire system is energized, and that telescope 60 and light 132 are in exact angular agreement as shown in Fig. 6. The amplifier AA is supplied at points 119—120 with power, and in accordance with input signals at the terminals 100—101 controls the direction and speed of the motor M having a field winding 121, and its armature 122 connected to the amplifier output terminals. Any conventional form of amplifier may be employed such as shown in Arnold Patent 1,403,475, dated January 17, 1922; Mathes 1,426,754, dated August 22, 1922; or Mathes 1,493,217, dated May 6, 1924. (I have not shown the details of the amplifier AA, which may be either of the electron tube type, or of tubeless construction, inasmuch as the amplifier construction does not form an essential part of the invention disclosed and claimed in this case).

The secondaries 98—115 of the transformers G and H are connected together at their terminals 118—117 respectively, and through adjustable taps 99—116 to the input of the amplifier AA.

Under the above condition (exact angular agreement) the input voltage at terminals 100—101 of the amplifier AA is zero, since the magnetic axis of rotor winding 87 of the receiver R is at 90° from the flux produced by its stator winding 86, also the magnetic axis corresponding to points 110—111 of the device RR is at 90° to its stator flux.

Suppose now that the motor M be "blocked" to prevent rotation, and the transmitter rotor 71 be rotated rapidly to a position of say 3° clockwise from that shown. Immediately, a corresponding displacement exists in the stator flux of the receiver R, and its secondary winding 87 is now inductively coupled to its primary flux —hence a voltage is present across the transformer G corresponding to the sine of the angle of transmitter displacement. Also the flux in the device RR has been shifted clockwise and the magnetic axis of points 110—111 is now inductively coupled to the flux produced by the combined magnetomotive forces of the rotor "polarizing" current and the stator currents. As a result of this condition a voltage exists across points 110—111 and hence across transformer H corresponding to the sine of the resultant angle of field displacement in device RR, also a torque is produced in the device RR tending to rotate its rotor to a position 3° clockwise from that shown.

Now the voltages across transformers G and H are combined in such polarity that they add under the conditions above stated. The result is that the net voltage input to the amplifier AA at points 100—101 is the sum of that produced in the receiver R and that produced in the device RR. The internal torque of the device RR, however, rotates its rotor (under restraint of the coupling device C) to agreement with the transmitter, therefore reducing the voltage across points 110—111 to zero. Thus after a short interval of time the input voltage at the amplifier drops to that produced in device R.

If now the motor M is released the torque resulting from the amplifier output will drive the searchlight in a direction to rotate the rotor of the device R into agreement with the transmitter, or clockwise 3°. Simultaneously, however, with the movement of the rotor of device R, the coupling device C through magnetic linkage between its "stator" 15—16 and its "rotor" 40 drags the rotor of the device RR in a clockwise direction, thus establishing across points 110—111 a voltage opposite to that of the device R. The net result is that the voltage across the terminals 100—101 of the amplifier AA becomes zero before the system of light and rotor of the receiver R reaches coincidence with the transmitter. This differential action of the voltage produced in the receiver R and the device RR introduces into the amplifier a control signal which is dependent upon the relative displacement between telescope 60 and light 132 plus or minus the "rate of change" of relative displacement. The voltage produced by the device RR therefore provides a higher net signal than that due to relative displacement when the displacement in increasing, thus helping to accelerate the load driven by the motor, and a lower and even a reversed net signal than that due to relative displacement when the displacement is decreasing, thus assisting in so controlling the motor as to avoid the searchlight "overshooting" the coincidence point with the telescope.

Likewise under a reversing condition when the searchlight is following the angular rotation of the telescope the voltage of the device RR supplements the displacement voltage of the receiver R in such manner as to oppose relative motion between telescope and searchlight, thereby eliminating the effects of dynamic hunting commonly referred to as "surging."

Consideration of the operation of the system of Fig. 6 indicates that for any "steady state" condition, viz:—at rest, or running at constant speed, the relative displacement between the stator and rotor magnetomotive forces of the device RR is zero, and that displacement exists, with resulting voltage across points 110—111 only when telescope and light are moving relatively to each other.

The taps 99—116 on the transformers G and H respectively permit of independent adjustment of sensitivity of control to relative displacement and "rate of change" of relative displacement between the telescope and the light.

Further consideration of Fig. 6 indicates that the rotor of the device RR derives its torque from the transmitter independently of the receiver R, while the rotor of the receiver R is driven synchronously with the light by the follow-up motor. In any "steady state" running condition the rotors of R aand RR operate at synchronous speeds but at different relative displacements between their rotor and stator flux axes.

Referring now to Fig. 7, I have shown in diagrammatic form a complete angular positional control system embodying my invention and utilizing the apparatus shown in detail in Figs. 4–5.

The operation of the system of Fig. 7 is essentially similar to that shown in Fig. 6, except that the "rate" voltage is secured by a slightly different arrangement of apparatus which is in some instances superior to the arrangement of Fig. 6. Corresponding parts are designated alike in Figs. 6 and 7, but where exact counterparts are used in slightly different arrangement they are shown differently in the two figures.

In Fig. 7 the telescope is similarly operated to Fig. 6 and the transmitter A is identical in all respects. The receiving device in Fig. 7 however consists of a differential transformer by which relative displacements between telescope and searchlight may be conveyed to the control system as angular field displacements instead of their corresponding voltages.

The transmitter secondary winding is connected at points 77—78—79 through conductors 80—81—82 to corresponding points 143—144—145 of the primary winding 141 of the differential transformer B, the rotor of which is driven from the motor M by the gears in similar fashion to the drive of the rotor of the receiver R in Fig. 6.

The secondary winding 142 of the differential transformer B is tapped at points 146—147—148 and electrically connected to corresponding points 151—152—153, 159—160—161 of the stator windings 149 and 157 of the device E and the device F respectively.

The device E is exactly similar to the device RR of Fig. 6 and is "polarized" in like manner at points 154 and the center point 177 of the primary winding 176 of the transformer H' whose opposite terminals are connected to points 155—156 corresponding to points 110—111 of the device RR of Fig. 6.

The device F is similar to the receiver R of Fig. 6—and its secondary winding 158 is connected at points 162—163 to the primary winding 170 of the transformer G'.

The voltage produced by device E across the primary of transformer H' corresponds to that produced across the transformer H of Fig. 6, while the voltage produced by the device F across the primary of transformer G' corresponds to that produced across the primary of transformer G of Fig. 6.

The rotor of the device F is normally clamped in a fixed position so that relative displacement between telescope and searchlight establishes a voltage across its secondary or rotor winding 158. The device F may be dispensed with in some instances, and its function in that instance is simulated by connection of the transformer primary winding 170 to the secondary terminals 147—148 of the device B, as shown in Fig. 7a by conductors 168—169. Under this condition the conductors 164—165 and the device F are removed, as are the connections to points 159—160—161.

Suppose now that the rotors are positioned as shown, and that the motor is "blocked" to prevent its rotation. Now let the rotor of the transmitter A be moved clockwise by 3°. Immediately a corresponding field displacement is present in the devices E and F, producing corresponding voltages across the primary windings of the transformers H'—G'. The combined voltage is impressed upon the amplifier input terminals 100—101 through the network including adjustable tap 172 on secondary 171, terminals 173—174, secondary 174a and adjustable tap 175.

Simultaneously with the displacement of the field in device E, a torque is developed therein tending to rotate its rotor to a position where its rotor and stator magnetomotive forces are again on the same plane, but this movement is opposed by the damping device D in such manner as to retard the movement of the rotor of the device E.

The combined voltages of the device E and the device F across the transformer H'—G' respectively, represents a signal having two components as in the system shown in Fig. 6. The voltage of the device F across transformer G' being due to relative displacement between light and telescope, and the voltage of the device E across the transformer H' being due to relative "rate of change" of displacement between telescope and light.

If the motor is released, the amplifier output signal drives it in direction to rotate the rotor of the differential transformer E through an angle corresponding to the original transmitter displacement, thereby differentially canceling the displacements from the "normal" axes of the devices E and F. Simultaneously however with the movement of the rotor of the differential transformer B in response to the input signal of the amplifier, the resulting internal torque of the device E tends to keep its rotor and stator magnetomotive forces in alignment, but the damping or retarding action of the damping unit D results in relative displacement in these magnetomotive forces and resulting voltage across points 155—156 of the rotor winding of device E, thereby resulting in the net amplifier input signal reaching zero, or reversing, before actual coincidence is reached between light and telescope.

The voltage of the device E is therefore of direction and magnitude to oppose "relative" motion or displacement between light and telescope, while the voltage of device F is of such direction and magnitude as to drive the motor in direction to cancel relative displacement.

Fundamentally the systems shown in Figs. 6 and 7 are identical, but in Fig. 7 the "rate" voltage is produced in a normally stationary rotor, while in Fig. 6 the "rate" voltage is produced by a device in which rotor and stator revolve relative each other synchronously with the transmitter.

In any "steady state" running condition the rotor of the device E will be displaced from its "normal" position by an angle corresponding to the disagreement between telescope and light as indicated by the relative displacements between the rotors of the transmitter A and the differential transformer B, but the voltage across the points 155—156 and hence across the primary of the transformer H', will be zero except during changes of displacement between light and telescope.

Although I have shown and described my invention as applied to searchlight azimuth control in accordance with angular directional signals from a distant telescope, and in two representative forms, I do not desire to be limited thereto, inasmuch as my invention is applicable broadly to any control system wherein a heavy object is to be positionally controlled in accordance with angular directions from a "Selsyn" type data transmitter.

I therefore intend my invention to be limited only to the extent of the appended claims.

What I claim as new and desire to secure by Letters Patent of the United States is as follows:

1. In an electrical positional control system a transmitter of angular directions, a receiver for producing a signal due to displacement between said transmitter and said receiver, a reversible motor adapted to drive said receiver into angular agreement with said transmitter, a second receiver deriving its positional torque from said transmitter independently of said first receiver and free to assume an angular alignment with said transmitter, means for deriving a signal from the second mentioned receiver due to its displacement from said transmitter, a magnetic coupling between said first mentioned and said second mentioned receivers whereby relative movement between the two receivers is opposed in proportion to rate of said relative movement, an amplifier system having its output connected with said motor, and means for impressing the combined output of both receivers upon said amplifier system for controlling said motor.

2. In an electrical control system, means for establishing a field displacement from a distant point, means for correcting said displacement including a reversible motor, means for establishing a voltage due to said displacement, separate means for establishing a second voltage due to said displacement, means for cancelling said displacement in said separate means independently of said correcting means and said motor, means for delaying said cancellation, and means for energizing said motor in accordance with both of said voltages for actuating first mentioned correcting means.

3. In an electrical positional control system, means for establishing a field displacement from either of two points, a reversible electric motor for operating one of said means, means responsive to said displacement for establishing a voltage due to said displacement, a second means for establishing a second voltage due to said displacement, means responsive to said second voltage for cancelling the effects of said displacement on said second means, means for controlling said motor in accordance with both of said voltages, and means for retarding the cancellation of the effect of said displacement on said second means for establishing a second voltage due to said displacement.

4. In an electrical control system, means for establishing a field displacement from a distant point, means for producing a voltage due to said displacement, a reversible motor adapted through electrical differential means for cancelling said displacement and simultaneously driving a load, means responsive to said displacement for producing simultaneously a voltage, separate from first mentioned voltage, and a torque tending to reduce last said voltage to zero, electromagnetic means of delaying said torque in reducing said last mentioned voltage to zero, and means responsive to both of said voltages for controlling said motor.

5. In combination with a remote transmitter and an object controlled thereby in an electrical positional control system, means for obtaining a voltage proportional to the rate of change of displacement between the remote transmitter and the object controlled from said transmitter, comprising an angular positional receiving device connected with said transmitter for deriving its positional control torque from said transmitter independently of said object, electromagnetic eddy current coupling means between said receiving device and said object whereby the change of angular position relative said object is opposed by said coupling means proportional to the rate of change of angular position, and means for obtaining from said angular positional receiving device a voltage having direction and magnitude dependent upon its relative displacement from said transmitter for controlling the rate of movement of said object in following said transmitter.

6. Apparatus for controlling an object in angular position from a distant point which comprises a transmitter of angular directions at said distant point, two receiving devices at said object capable of producing voltages of direction and magnitude dependent upon their angular displacements from said transmitter, means for rotationally positioning one of said receiving devices synchronously with said object, means for rotationally positioning the other of said receiving devices independently of the aforesaid means but in angular agreement to said transmitter, means including an electromagnetic eddy current damper for opposing relative angular positioning of said receiving devices in proportion to their rates of change of relative angular position, and means for controlling the first said means in accordance with the relative angular displacements of both of said receiving devices to said transmitter.

7. Means for producing a signal proportional to the angular velocity of a "Selsyn" type transmitter, comprising a receiver deriving its positional torque from said transmitter, means including an eddy curent torque motor for causing said receiver to follow said transmitter in angular direction with a disagreement proportional to its speed, and means for deriving from said receiver a signal proportional to said disagreement.

8. Means for compensating for velocity and acceleration lag in an electrical angular positional follow-up control system comprising a separate auxiliary follow-up system including means having inertia characteristics similar generally to those of the main control system, means for deriving a signal from said auxiliary follow-up system, and means for utilizing said signal for differentially controlling said angular positional follow-up control system.

ALGER S. RIGGS.